United States Patent

Seng

[15] 3,686,400
[45] Aug. 22, 1972

[54] PHARMACEUTICAL COMPOSITIONS CONTAINING AND METHODS OF USING -2-AMINO-3-CARBAMIDO QUINOXALINE-DI-N-OXIDES

[72] Inventor: Florin Seng, Odenthal, Germany

[73] Assignee: Farbenfabriken Bayer Aktiengesellschaft, Leverkusen, Germany

[22] Filed: Jan. 29, 1970

[21] Appl. No.: 12,530

Related U.S. Application Data

[62] Division of Ser. No. 742,168, July 3, 1968, Pat. No. 3,609,151.

[30] Foreign Application Priority Data

July 26, 1967 Germany..................F 53057

[52] U.S. Cl................................424/250
[51] Int. Cl..............................A61k 27/00
[58] Field of Search......................424/250

[56] References Cited

UNITED STATES PATENTS 3,260,720  7/1966  Berndt......................260/250

Primary Examiner—Jerome D. Goldberg
Attorney—Jacobs & Jacobs

[57] ABSTRACT

2-Amino-3-carbamido-quinoxaline-di-N-oxides of the formula

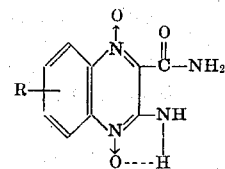

are produced by hydrolising the corresponding 2-amino-3-cyanoquinoxaline-di-N-oxides of the formula

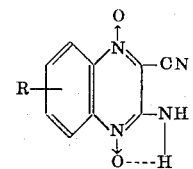

in an acidic solution wherein R is hydrogen, halogen, lower alkyl or lower alkoxy. The compounds are useful in treatment of infections from gram positive and gram negative bacteria and are administered in the general range of 25 mg/kg orally or parenterally.

10 Claims, No Drawings

PHARMACEUTICAL COMPOSITIONS CONTAINING AND METHODS OF USING -2-AMINO-3-CARBAMIDO QUINOXALINE-DI-N-OXIDES

CROSS REFERENCE

This is a divisional of Ser. No. 742,168, filed July 3, 1968, now U. S. Pat. No. 3,609,151 issued Sept. 28, 1971.

The present invention is concerned with 2-amino-3-carbamidodi-N-oxides which have been found to exhibit exceptional bactericidal activity. More particularly the compounds of the present invention are 2-amino-3-carbamido-quinoxaline-di-N-oxides which may be present in tautomeric N-hydroxy imino form and which may be represented by the following formulas:

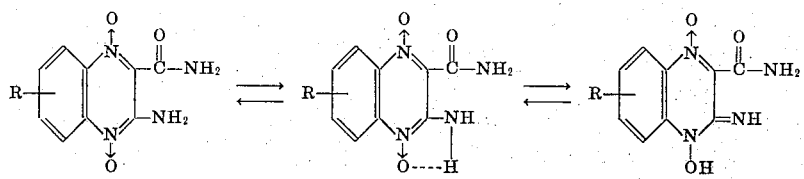

wherein R is hydrogen, halogen, lower alkyl or lower alkoxy. Preferred values for R include methyl, methoxy, chlorine, bromine and fluorine.

Since the compounds of the present invention have shown hydrogen bridges and may be present in the above represented tautomeric N-hydroxy imino, form for convenience the middle formula above set forth will be used for illustrative convenience.

The invention also relates to a process for the preparation of a compound of formulas (1) in which the corresponding new 2-amino-3-cyano-quinoxaline-di-N-oxide of the formula:

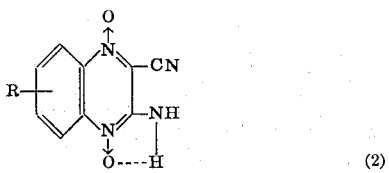

is hydrolyzed in acidic solution.

Taking 2-amino-3-carbamido-quinoxaline-di-N-oxide as an example, the reaction is illustrated by the following equation:

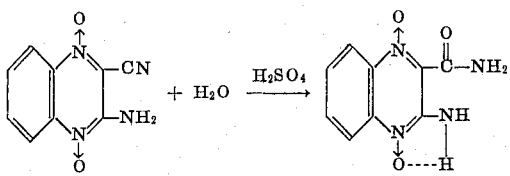

The hydrolysis is expediently carried out by dissolving the 2-amino-3-cyano-quinoxaline-di-N-oxides in sulphuric acid at a concentration of 80 – 100 percent, preferably approximately 96 percent, the remainder being water, and subsequently stirring at hydrolysis temperature. This temperature is generally 25° – 80°C, preferably 50° – 70°C. After neutralization, preferably with an aqueous ammonia solution or with the aqueous solution of an oxide, hydroxide, carbonate or bicarbonate of an alkali metal or alkaline earth metal, particularly sodium, potassium or magnesium, the 2-amino-3-carbonamido-quinoxaline-di-N-oxides are obtained as crystalline compounds.

The new 2-amino-3-cyano-quinoxaline-di-N-oxides required as starting materials are obtainable, according to our own previous proposal, by reacting benzofuroxans with malonic acid dinitrile in the presence of a catalytic amount of an amine.

The process of the invention is illustrated by the following non-limitative Examples.

EXAMPLE 1

Preparation of 2-amino-3-carbonamido-quinoxaline-di-N-oxide (I; R = H).

250 g (1.25 mole) of 2-amino-3-cyano-quinoxaline-di-N-oxide are dissolved in a mixture of 1000 ml of 96 percent sulphuric acid and 40 g of water and stirred at 60°C for 5 hours. The solution is subsequently poured on to 1.5 kg of ice and neutralized with 2650 ml of 33 percent ammonia. 250 g (92.6 percent of theory), of 2-amino-3-carbonamido-quinoxaline-di-N-oxide are obtained in the form of red crystals which decompose, after recrystallization from dimethyl formamide, at 242° – 243°C.

The 2-amino-3-cyano-quinoxaline-di-N-oxide used as starting compound is obtained as follows:

13.6 g (0.1 mole) of benzofuroxan are suspended in 150 ml of ethanol and mixed with 6.6 g (0.1 mole) of malonic acid dinitrile. 8.5 g (0.1 mole) of piperidine are slowly added dropwise. The suspended benzofuroxan dissolves and the temperature of the reaction mixture rises to 30° – 70°C, depending on the speed of the dropwise addition. After 3 hours, the mixture is cooled to about +5°C and after filtering off with suction, 13 g (64.3 percent of theorey) of 2-amino-3-cyano-quinoxaline-di-N-oxide are obtained in the form of red crystals; m.p. 221°–223°C (from dimethyl formamide). When the process is carried out in dimethyl formamide, the yield rises to 86 percent of theory.

EXAMPLE 2

The compounds II – IV listed in the Table were prepared according to the process of Example 1 using 7-methyl, 7-chloro- or 7-methoxy-2-amino-3-cyano-quinoxaline-di-N-oxide respectively as the starting material, which is obtained as being obvious from Example 1:

| Compound No. | Color | Temperature of decomposition | Yield |
|---|---|---|---|

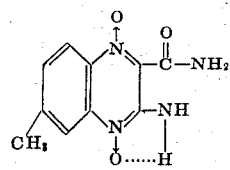

| II | yellow-red | 226°–228°C | 91.7% |

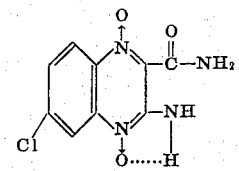

| III | dark-red | 246°C | 93.4% |

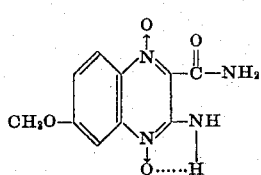

| IV | dark-red | 246°–247°C | 92.4% |

The bactericidal activity of the compounds according to the present invention has been proving both in vitro tests exhibiting good antibacterial effect and in vivo tests on animals. The compounds of the present invention may be administered orally or parenterally. The most advantageous dosage range has been found to be from about 25 mg to about 500 mg and more particularly dosage ranges from about 25 mg/kg to about 150 mg/kg per day have exhibited beneficial and effective results.

It is, however, to be appreciated that in administering compounds of the present invention as in the case with a therapeutic substance a variety of factors must be taken into consideration in determining the dosage to be administered in the given case. These factors include the body weight of the patient receiving the compound, the severity of the condition to be treated, the post-medical history and the current state of health. Depending upon these and other factors it is possible that dosage ranges lower than or higher than the above indicated ranges could be utilized effectively. In the case where fairly large amounts are to be adminstered it is generally recognized to be advisable to distribute the total daily dose by administering several individual doses during the course of a day.

The compounds of the present case can be administered either as such or in combination with pharmaceutically acceptable, non-toxic carriers.

Suitable forms of administration in combination with various inert carriers are tablets, capsules, powders, sprays, aqueous suspensions, injectable solutions (which may be contained in ampules), elixirs, syrups and the like. Such carriers include solid extenders or filler, a sterile aqueous medium as well as various non-toxic organic solvents and the like. Obviously, the tablets and the like intended for oral administration can be provided with saccharine or similar additives. The therapeutically active compound should be present in the aforesaid case in a concentration of about 0.5 to 90 per cent by weight of the total mixture, that is in amounts which suffice to achieve the dosage mentioned above.

In the case of oral application, the tablets may of course also contain additives such as sodium citrate, calcium carbonate and dicalcium phosphate, together with various admixture such as starch, preferably potato starch and the like, and binders, such as polyvinyl-pyrrolidone, gelatine and the like. Furthermore, lubricants such as magnesium stearate, sodium lauryl sulphate and talc can be added for producing tablets. In the case of aqueous suspensions and/or elixirs intended for oral administration, the active compound can be used with various tests improvers, dyestuffs, emulsifiers and/or dispersing agents, together with diluents, such as water, ethanol, propylene glycol, glycerine and similar compounds or combinations.

In the case of parenteral administration, there may be used solutions or suspensions of the active compounds in sesame oil or peanut oil or in aqueous propylene glycol or N,N-dimethyl formamide. When required, such solutions or suspensions should first be rendered isotonic by the addition of the necessary amount of salt or glucose. Solutions or suspensions of this type are mainly suitable for intramuscular and intraperitoneal injections.

The actual formulation of such forms of administration are per se known.

The effectiveness of the compounds of the present invention is more clearly appreciated by the following experiments or compounds representative of those embraced by formula 1.

In animal tests on white mice, the animals were infected intraperitoneally and treated subcutaneously or orally as follows:

1. Single doses of 25, 50, 200 and 500 mg/kg prior to infection.
2. Two doses of 15 and 20 mg/kg, respectively, 2 hours before and 3 hours after the infection.

These dosages were well tolerated.

Depending on the compound the acute toxicity range for rats and mice is between 150 and about 1000 mg/kg in the case of a single oral administration. The use of the new compounds against mycoplasma infections is also envisaged.

1. Animal tests on white mice:

| Compound No. | Bacteria used for infection | % Surviving animals 24 hours after infection |
|---|---|---|
| I (R = H) | E. coli | 100 |
|  | Staph. aureus | 100 |
|  | Strept. pyogenes | 100 |
| II (R = CH₃) | Staph. aureus | 50 |

| | III | Staph. aureus | 60 |
| | (R = Cl) | Strept. pyogenes | 50 |

2. Inhibition values in vitro:

| Bacterium | Minimum Inhibition concentrations in µg/ml nutrient of compound | | |
| --- | --- | --- | --- |
| | I (R = H) | II (R = CH₃) | III (R = Cl) |
| E. coli | 50 | 50 | 100 |
| Proteus sp. | 50 | 100 | 100 |
| Klebsiella sp. | 50 | 150 | 100 |
| Staph. aureus | 50 | 100 | 100 |
| Strept. pyogenes | 150 | 100 | 100 |

The 2-amino-3-carbonamido-di-N-oxides show furthermore (same general dosage range as disclosed) activity against amoeba and flagellata (*E. histolytica, Trichomonas vaginalis, Lamblia muris*) both in in vitro tests and in vivo tests on animals (mice, rats, goldenhamsters).

Compounds I, II and III are respectively those of the general formula 1, wherein R is hydrogen (I), methyl (II) or chlorine (III).

When the compounds of the present invention are utilized in the form of pharmaceutical compositions these must be dispensed in unit dosage form. The individual preparations can therefore be made up each containing a unit dose, 2, 3 or 4 unit doses, a half, a third or a fourth of a unit dose or the like as desired.

I claim

1. An antibacterial pharmaceutical composition comprising an antibacterially effective amount of a compound, of the formula:

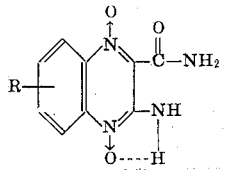

wherein R is hydrogen, halo, lower alkyl or lower alkoxy, and a pharmaceutically acceptable non-toxic carrier or diluent.

2. An antibacterial pharmaceutical composition according to claim 1 wherein R is hydrogen, chloro, methyl or methoxy.

3. An antibacterial pharmaceutical composition according to claim 2 in unit dosage form.

4. An antibacterial pharmaceutical composition according to claim 3 wherein said unit dosage form is a tablet, capsule, powder or ampoule.

5. An antibacterial pharmaceutical composition according to claim 4 wherein said compound is 2-amino-3-carbamidoquinoxaline-di-N-oxide.

6. The method of combatting bacterial infection of an animal or human which comprises administering to said animal or human an antibacterially effective amount of a compound of the formula:

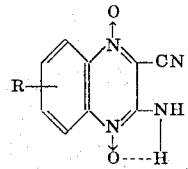

wherein R is hydrogen, halo, lower alkyl or lower alkoxy.

7. The method according to claim 6 wherein R is hydrogen, chloro, methyl or methoxy.

8. The method according to claim 6 wherein said compound is administered in a dose of from about 25 mg/kg to about 150 mg/kg of body weight.

9. The method according to claim 8 wherein said dose of compound is administered orally or parenterally.

10. The method according to claim 9 wherein said compound is 2-amino-3-carbamido-quinoxaline-di-N-oxide.

* * * * *

PO-1050
(5/69)

UNITED STATES PATENT OFFICE
CERTIFICATE OF CORRECTION

Patent No. 3,686,400    Dated August 22, 1972

Inventor(s) Florin Seng et al.

It is certified that error appears in the above-identified patent and that said Letters Patent are hereby corrected as shown below:

In the heading "Inventor:" delete the inventor's name as shown and insert in lieu thereof the following inventors:

-- Florin Seng, Koln, Germany

Kurt Ley, Odenthal, Germany

Karl-Georg Metzger, Wuppertal-Elberfeld, Germany

Dieter Fritsche, Wuppertal-Vohwinkel, Germany --

Signed and sealed this 13th day of March 1973.

(SEAL)
Attest:

EDWARD M. FLETCHER, JR.
Attesting Officer

ROBERT GOTTSCHALK
Commissioner of Patents